July 17, 1951 D. E. HARRIS 2,560,795
HEATER FOR LUBRICANTS
Filed Dec. 18, 1948 2 Sheets-Sheet 1
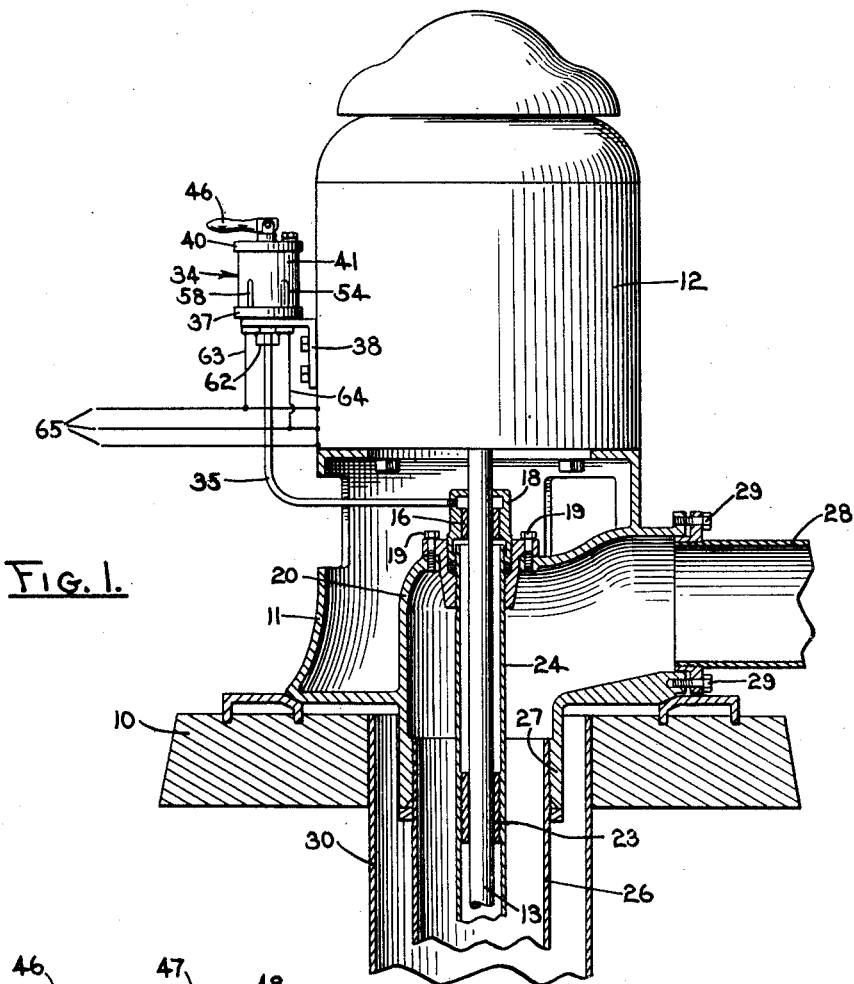
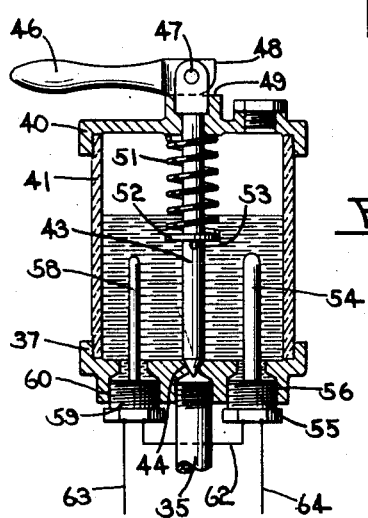
INVENTOR.
DALE E. HARRIS
BY
ATTORNEYS July 17, 1951 D. E. HARRIS 2,560,795
HEATER FOR LUBRICANTS
Filed Dec. 18, 1948 2 Sheets-Sheet 2

INVENTOR.
DALE E. HARRIS
BY
ATTORNEYS

Patented July 17, 1951

2,560,795

UNITED STATES PATENT OFFICE 2,560,795

HEATER FOR LUBRICANTS

Dale E. Harris, Sanger, Calif.

Application December 18, 1948, Serial No. 66,104

2 Claims. (Cl. 219—38)

The present invention relates to heaters for lubricants and more particularly to such a device adapted for use in assuring substantially constant lubricating effect in apparatus subjected to wide ranges of temperature variation in its operational environment.

The need for the device of the present invention is readily demonstrated by reference to the lubrication systems of irrigation pumps, which pumps have water impellers rotated at high speeds. Irrigation pumps are adapted to be employed in relatively unsheltered positions where they are subjected to extensive temperature variations. Such pumps are normally lubricated by gravitational oil systems. These systems normally include a manual control for modulating oil flow. When adjusted to supply an appropriate amount of oil to bearing surfaces at a given temperature, the systems supply an insufficient amount of oil at cooler temperatures and an excess and wasteful quantity of oil at warmer temperatures. In many instances, when the temperature drops considerably, the oil becomes so viscous that it is unable to flow at all through the lines provided therefor. Thus, when such pumps are started in cold weather, the bearings in the pumps are frequently without lubrication for a considerable period and in many instances for a complete operating period during which the temperature of the oil is not raised sufficiently to permit the free flow through the system. Even in irrigation pumps in which the oil reservoir is located in sufficiently close proximity to the bearings to be affected by frictional heat thereof or adjacent an electric motor to absorb heat from the driving energy imparted to the motor, the oil does not lubricate the moving parts until the pump has been employed for a considerable period. Even in such pumps in which the oil eventually becomes sufficiently warm gravitationally to flow, the wear on the moving parts of the pumps is excessive during the initial periods of operation.

It is, therefore, an object of the present invention to provide means for heating the oil lubricant in oil lubricating systems so that the oil will flow freely when needed.

It is another object to assure substantially constant lubricating effect in a lubricating system employed in an apparatus subjected to wide temperature variations in its operational environment.

Another object of the present invention is to provide means for heating the oil lubricant of a pump or other mechanism during the operation thereof and to discontinue the heating during non-operating periods.

Another object of the invention is automatically to maintain the temperature of oil in a lubricating system substantially constant and at a predetermined optimum lubricating temperature during all periods of operation of the apparatus with which the system is associated.

Another object of the invention is to provide means for heating the oil lubricant of an electric motor-driven turbine water pump by means of an electrically operated heater energized during the operation of the pump.

Another object of the present invention is to provide an electrically operated heater for heating the oil lubricant of a turbine water pump or the like while the pump is electrically operated combined with means for electrically and automatically controlling the temperature to which the oil is heated.

Other objects and advantages of the present invention will become apparent in the following description.

In the drawings:

Fig. 1 is a fragmentary, vertical, axial, sectional view through a rotary turbine water pump with the electric motor thereof being shown in elevation and the water pump being of the gravitationally lubricated type.

Fig. 2 is an enlarged, vertical, axial, sectional view through a manually controlled lubricating reservoir for the turbine water pump shown in Fig. 1.

Figure 3:
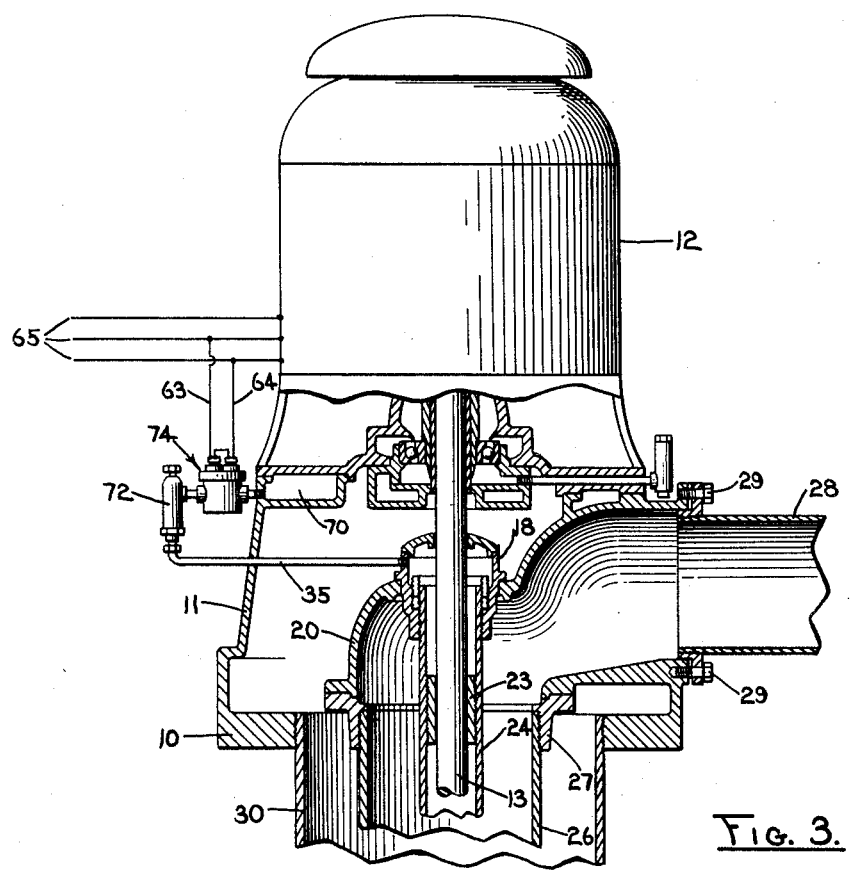
Fig. 3 is a fragmentary vertical, axial, sectional view through another form of turbine water pump with a drip feed type lubricating system showing the driving electric motor thereof in elevation.
Figure 4:
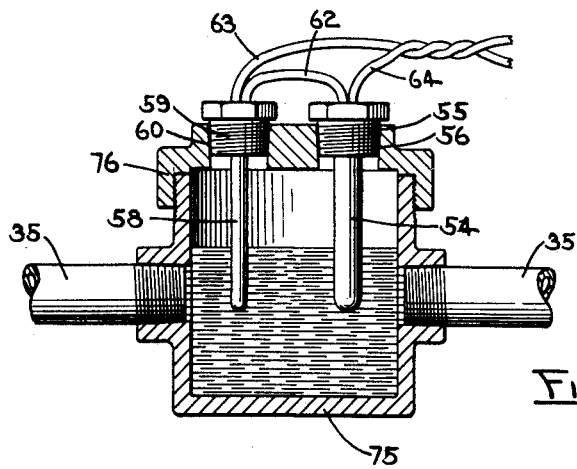
Fig. 4 is a vertical, axial, sectional view through the lubricant heating reservoir as employed in the pump illustrated in Fig. 3.

Referring in greater detail particularly to the construction as illustrated in Figs. 1 and 2 of the drawing, the turbine water pump shown is provided with a horizontally located base member 10 with a motor-supporting casting 11 attached to the base and extended upwardly therefrom, with an electric motor 12 supported thereon. The shaft 13 of the motor extends downwardly therefrom and is rotatable in a bronze bearing 16 securely held in a housing 18 which is screwed or otherwise attached at 19 to an inner shell 20 of the supporting casting 11. The motor shaft 13 is also rotatable in further bronze bearings 23, below the bearing 16, securely held in a shaft-enclosing tube 24 which is supported coaxially of the shaft on a downwardly extending portion of the housing 18.

The pump is provided with an eduction pipe 26 located coaxially of the motor shaft 13 in supporting relation to a downwardly extended sleeve portion 27 formed integrally with the motor supporting housing 11. The motor shaft 13 and the eduction pipe 26 are supported in depending relation from the base 10 in a well casing 30.

The lubrication system for the pump is normally provided with a manually operable lubricator 34 connected by means of a lubrication tube 35 to the interior of the housing 18. The lubricator 34 is provided, as shown in detail in Fig. 2, with a circular bottom portion 37 which is supported on the housing of the motor 12 by means of a bracket 38 attached to the motor housing and to said bottom portion 37. The lubricator is also provided with a cover 40 with a transparent, hollow, cylindrical body 41 attached and extending between the cover 40 and the bottom portion 37 and in fluid tight association therewith forming an oil reservoir.

The flow of lubricating oil, from the manually operable lubricator 34 to the housing 18 through the lubrication tube 35, is controlled by providing a needle valve 43 guided coaxially of the lubricator 34 with the lower conical pointed end of the needle valve adapted to be seated against a centrally apertured, conical valve seat 44 when the lubricator is closed against passage of lubricating oil therefrom. The needle valve 43 is manually operable by providing an operating lever 46 pivoted at 47 to the upper end of the needle valve and having an integral, eccentric cam 48 adjacent the pivot 47 which operatively engages a horizontal surface 49 formed on the cover 40 for the lubricator. The needle valve 43 is urged downwardly to closed position by a helical compression spring 51 located around the needle valve 43 and held under compression between the underside of the cover 40 and a washer 52 located around the needle valve 43 and held against longitudinal movement on the needle valve by means of a pin 53 extending through the needle valve.

Lubricating oil within the lubricator 34 is electrically heated by providing an elongated, electrically operated heater 54, preferably of the so-called bayonet type, which extends into the interior of the lubricator. The heater is conveniently held in position by an externally threaded enlarged head 55 formed thereon and threadably received into an internally threaded socket 56 formed in the bottom portion 37 of the lubricator. The temperature to which the lubricating oil is heated is thermostatically controlled by means of an elongated thermostat 58 which also extents into the interior of the lubricator and is held securely therein by means of an externally threaded enlarged head 59 of the thermostat threadably received into an internally threaded socket 60 formed in the bottom portion 37 of the lubricator. The heater provides a pair of terminals between which its heating element is connected and the thermostat a pair of terminals electrically on opposite sides thereof. The electrical heater 54 and the thermostat 58 are electrically connected in series by means of a conductor 62 connected between one terminal of each of the electrical heater and the thermostat. A lead wire 63 is connected to the opposite terminal of the thermostat and a return wire 64 is connected to the other terminal of the electric heater 54. The electric motor 12 is usually electrically energized by means of three leads 65 and the lead wire 63 and the return wire 64 connect the thermostat and the heater in parallel with the motor between any two of the leads.

The thermostat 58 is of any suitable form adapted to interrupt the electrical circuit therethrough when the temperature is above a predetermined value suited to lubricating efficiency and to complete the circuit through the heater 54 when the temperature is below such value. The thermostat, being of any suitable form, conventional or otherwise, is not described or shown in detail. Upon energizing the leads 65 to start the motor 12, the thermostat operates to energize the heater if the temperature is below the predetermined optimum lubricating value. When heat emanating from the heater raises the temperature of oil in the lubricator 34 to the optimum value, the thermostat operates to interrupt flow of current through the heater and thus excessive thinning of the oil is avoided. In this manner, the thermostat and heater circuit of the present invention operates to maintain the lubricating oil at or about a predetermined temperature to the end that the oil flow and lubricating effect be substantially constant whenever the motor 12 is operated.

*Second illustrative installation of the present invention*

The turbine pump shown in Fig. 3 employs a lubrication system distinguished from the lubrication system described for the pump illustrated in Fig. 1. Other than in this particular, the pumps are essentially similar and for purposes of descriptive simplicity corresponding parts of the pumps are identified by corresponding numbers. Distinctive features are briefly described as follows:

The pump shown in Fig. 3 employs a lubricating oil reservoir 70 formed integrally with the motor-supporting casting 11. The lubrication tube 35 is connected between the reservoir 70 and the housing 18 at the upper end of the shaft-enclosing tube 24 so that lubricating oil may gravitate from the reservoir to the housing 18 and downwardly between the bearing 23 and the shaft 13. A conventional drip feed regulator 72 is interposed opposite end portions of the lubrication tube 35. A lubrication heater 74 of the present invention is arranged in fluid series in the lubrication tube 35 with the drip feed regulator. The heater is provided with a cup-like reservoir 75 into which the lubrication tube 35 extends. A cover 76 is threadedly received on the upper end of the reservoir. An electric heater 54, of the type previously described, extends through the cover 76 into the chamber 75 and is secured by means of the externally threaded enlarged head 55 threadably received into the internally threaded socket 56 in the cover 76. The elongated thermostat 58 also extends through the cover 76 into the chamber 75 and is attached by means of the externally threaded enlarged head 59 thereof threadedly received into the internally threaded socket 60 formed in the cover 76. The electric heater 54 and the thermostat 58 are similarly connected in series with each other and in parallel with the motor 12 by means of lead wire 63, conductor 62, and return wire 64, as previously described.

Although the two forms of lubrication heater system are herein shown and described as used in connection with an electric motor driven turbine pump, it is to be understood that the lubrication heater system of the present invention may be effectively applied to other electric motor driven mechanism with bearings and other relatively moving parts which require oil lubrication.

Operation

The operations of the systems of the present invention are clearly apparent and briefly summarized at this point. The operating lever 46 and the drip feed regulator 72 are manually adjusted in the usual manner to regulate the flow of lubricating oil through the conduit tubes 35 to supply a desired amount of oil to the bearings 16 and 23 at the temperature at which the thermostats 59 operate. The lever and the drip feed regulator are also operable to shut off the oil so that there will be no waste during extended periods of non-operation of the pumps. This is particularly valuable when the environments of the pumps are sufficiently warm for the oil to flow freely through the tubes 35.

When the motors 12 are energized through the leads 65 the thermostats 58 open the electrical circuit through the heaters 54 whenever the temperature is above the predetermined optimum oil temperature for accurate valving of oil flow to the bearings 16 and 23. Whenever the temperature is below such optimum predetermined value, the thermostats close the electrical circuits through the lead wires 63, conductors 62 and return wires 64 and the heaters are energized. It will be apparent that when the pumps are operating in cold environments the heaters will promptly elevate the temperatures of the oil in the lubricator 34 and/or reservoir 75 sufficiently for the flow of oil at the rates predetermined by adjustment of lever 46 and/or drip feed regulator 72 so that the bearings are promptly supplied with adequate lubrication. The thermostats not only save electrical energy that would be wasted if the heaters were continually energized during motor operation, but more significantly protect the lubrication systems against excessive thinning of the oil by excessive heating thereof.

Normally, when conventional lubrication systems are employed in pumps or other apparatus, it is necessary that the systems be frequently readjusted to compensate for temperature changes. This necessitates frequent and inconvenient inspection by an operator and requires farmers employing pumps of the type described, periodically to inspect the lubrication thereof during all periods of operation. The lubrication systems of the present invention eliminate this continuous or frequent inspection and serve to save the trouble and expense incident thereto.

The systems insure adequate lubrication at all times. They are simple in structure, economical to produce, and are easily embodied in conventional pumps and other apparatus in which the problems described are present.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and structures.

Having described my invention, which I claim as new and desire to secure by Letters Patent is:

1. In an apparatus having an electric motor with a circuit connected thereto for electrical energization of the motor, said motor having a drive shaft rotatably received in a stationary bearing, a lubricating oil reservoir located above the bearing, and a lubricating oil conduit connected between the reservoir and the bearing for the gravitational feeding of oil from the reservoir to the bearing, a lubrication heater comprising an electrically energized heater extending into a quantity of the lubricating oil, a thermostat extending into the oil adjacent the heater, means electrically connecting the heater and thermostat in series and the heater and thermostat circuit in parallel with the electrical motor, and manually operable valve means between the reservoir and the oil conduit for controlling the flow of oil from the reservoir into the oil conduit.

2. In an apparatus having an electric motor, a drive shaft, a bearing rotatably mounting the shaft, a lubrication oil reservoir located above the bearing and supported on the motor, and an oil lubrication conduit connecting an outlet at the bottom on the reservoir and the bearing, a heating system comprising an electrically energized heater extending into the reservoir closely adjacent to the outlet of the reservoir, a thermostat extending into the reservoir, and means electrically connecting the heater and thermostat in series and the series circuit of the thermostat and heater in parallel with the motor.

DALE E. HARRIS.

REFERENCES CITED

The following references are of record in the file of this patent:

UNITED STATES PATENTS

| Number | Name | Date |
|---|---|---|
| 1,652,409 | Moulthrop | Dec. 13, 1927 |
| 1,675,689 | Biggs | July 3, 1928 |
| 1,815,589 | Saachy | July 21, 1931 |
| 1,861,877 | Quill | June 7, 1932 |
| 2,048,439 | Fairchild | July 21, 1936 |
| 2,073,847 | Miller | Mar. 16, 1937 |